(12) United States Patent
Donderici et al.

(10) Patent No.: US 9,310,508 B2
(45) Date of Patent: Apr. 12, 2016

(54) METHOD AND APPARATUS FOR SENSING ELONGATED SUBTERRANEAN ANOMALIES

(75) Inventors: Burkay Donderici, Houston, TX (US); Abbas Sami Eyuboglu, Conroe, TX (US); Michael S. Bittar, Houston, TX (US); Clive D. Menezes, Conroe, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 72 days.

(21) Appl. No.: 13/521,769

(22) PCT Filed: Jun. 29, 2010

(86) PCT No.: PCT/US2010/040447
§ 371 (c)(1),
(2), (4) Date: Jul. 12, 2012

(87) PCT Pub. No.: WO2012/002937
PCT Pub. Date: Jan. 5, 2012

(65) Prior Publication Data
US 2013/0105224 A1 May 2, 2013

(51) Int. Cl.
*E21B 7/04* (2006.01)
*G01V 3/12* (2006.01)
(Continued)

(52) U.S. Cl.
CPC ... *G01V 3/12* (2013.01); *E21B 7/04* (2013.01); *G01V 3/30* (2013.01); *G01V 3/38* (2013.01)

(58) Field of Classification Search
USPC .............................. 175/40, 45, 61
See application file for complete search history.

(56) References Cited

U.S. PATENT DOCUMENTS 3,406,766 A 10/1968 Henderson
3,982,176 A 9/1976 Meador
(Continued)

FOREIGN PATENT DOCUMENTS

FR 2561395 9/1985
GB 1363079 8/1974
(Continued)

OTHER PUBLICATIONS

Alberty, Mark William "Method to Detect Casing Point in a Well from Resistivity Ahead of the Bit", App. No. PCT/US2010/0000729, (Jan. 7, 2010),14-pgs.

(Continued)

*Primary Examiner* — Kenneth L Thompson
(74) *Attorney, Agent, or Firm* — Krueger Iselin LLP; Alan Bryson

(57) ABSTRACT

Various logging-while-drilling (LWD) systems and methods provide resistivity logging coupled with deep detection of elongated anomalies at acute angles, enabling effective geosteering without disrupting drilling operations and without requiring intervention in the operations of the existing well. One LWD system embodiment employs a tool having tilted antennas as the transmitter and the receiver, where at least one of the antennas is placed in the vicinity of the bit, making it possible to detect existing wells at distances of 50-100 feet. In some cases, the detection distance is increased by enhancing the visibility of the existing well using a contrast fluid treatment on target well, either to fill the bore or to surround the well with treated cement or fluids that invade the formation. At least one inversion method separates the inversion of formation parameters from the inversion of parameters specifying distance, direction, and orientation of the existing well.

20 Claims, 6 Drawing Sheets

(51) Int. Cl.
*G01V 3/30* (2006.01)
*E21B 47/0228* (2012.01)
*E21B 47/092* (2012.01)
*G01V 3/38* (2006.01)

(56) References Cited

U.S. PATENT DOCUMENTS

| | | |
|---|---|---|
| 4,072,200 A | 2/1978 | Morris et al. |
| 4,104,596 A | 8/1978 | Smither |
| 4,224,989 A | 9/1980 | Blount |
| 4,258,321 A | 3/1981 | Neale |
| 4,297,699 A | 10/1981 | Fowler et al. |
| 4,430,653 A | 2/1984 | Coon et al. |
| 4,443,762 A | 4/1984 | Kuckes |
| 4,458,767 A | 7/1984 | Hoehn, Jr. |
| 4,502,010 A | 2/1985 | Kuckes |
| 4,504,833 A | 3/1985 | Fowler et al. |
| 4,593,770 A | 6/1986 | Hoehn, Jr. |
| 4,670,717 A | 6/1987 | Sender |
| 4,700,142 A | 10/1987 | Kuckes |
| 4,791,373 A | 12/1988 | Kuckes |
| 4,814,768 A | 3/1989 | Chang |
| 4,825,421 A | 4/1989 | Jeter |
| 4,829,488 A | 5/1989 | Siegfried, II |
| 4,845,434 A | 7/1989 | Kuckes et al. |
| 4,909,336 A | 3/1990 | Brown et al. |
| 5,113,192 A | 5/1992 | Thomas |
| 5,133,418 A | 7/1992 | Gibson et al. |
| 5,138,313 A | 8/1992 | Barrington |
| 5,155,198 A | 10/1992 | Keohan |
| 5,248,975 A | 9/1993 | Schutz |
| 5,318,123 A | 6/1994 | Venditto et al. |
| 5,343,152 A | 8/1994 | Kuckes |
| 5,357,253 A | 10/1994 | Van Etten et al. |
| 5,358,050 A | 10/1994 | Schmidt |
| 5,377,104 A | 12/1994 | Sorrells et al. |
| 5,389,881 A | 2/1995 | Bittar et al. |
| 5,400,030 A | 3/1995 | Duren et al. |
| 5,420,589 A | 5/1995 | Wells et al. |
| 5,503,225 A | 4/1996 | Withers |
| 5,530,359 A | 6/1996 | Habashy et al. |
| 5,541,517 A | 7/1996 | Hartmann et al. |
| 5,552,786 A | 9/1996 | Xia et al. |
| 5,631,562 A | 5/1997 | Cram et al. |
| 5,676,212 A | 10/1997 | Kuckes |
| 5,720,355 A | 2/1998 | Lamine et al. |
| 5,747,750 A | 5/1998 | Bailey et al. |
| 5,757,191 A | 5/1998 | Gianzero |
| 5,765,642 A | 6/1998 | Surjaatmadja |
| 5,900,833 A | 5/1999 | Sunlin et al. |
| 5,917,160 A | 6/1999 | Bailey |
| 5,923,170 A | 7/1999 | Kuckes |
| 6,098,727 A | 8/2000 | Ringgenberg et al. |
| 6,100,839 A | 8/2000 | Heger et al. |
| 6,163,155 A | 12/2000 | Bittar |
| 6,181,138 B1 | 1/2001 | Hagiwara et al. |
| 6,191,586 B1 | 2/2001 | Bittar |
| 6,191,588 B1 | 2/2001 | Chen |
| 6,216,783 B1 | 4/2001 | Hocking et al. |
| 6,218,842 B1 | 4/2001 | Bittar |
| 6,257,334 B1 | 7/2001 | Cyr |
| 6,353,321 B1 | 3/2002 | Bittar |
| 6,359,438 B1 | 3/2002 | Bittar |
| 6,389,438 B1 | 5/2002 | Zhou |
| 6,460,936 B1 | 10/2002 | Abramov et al. |
| 6,476,609 B1 | 11/2002 | Bittar |
| 6,496,137 B1 | 12/2002 | Johansson |
| 6,538,447 B2 | 3/2003 | Bittar |
| 6,633,252 B2 | 10/2003 | Stolarczyk et al. |
| 6,651,739 B2 | 11/2003 | Arndt et al. |
| 6,672,409 B1 | 1/2004 | Dock et al. |
| 6,712,140 B2 | 3/2004 | Van Oers et al. |
| 6,755,263 B2 | 6/2004 | Alft et al. |
| 6,765,385 B2 | 7/2004 | Sinclair et al. |
| 6,771,206 B2 | 8/2004 | Berthelier et al. |
| 6,778,127 B2 | 8/2004 | Stolarczyk et al. |
| 6,810,331 B2 | 10/2004 | Bittar et al. |
| 6,856,132 B2 | 2/2005 | Appel |
| 6,885,943 B2 | 4/2005 | Bittar et al. |
| 6,911,824 B2 | 6/2005 | Bittar |
| 6,925,031 B2 | 8/2005 | Kriegshauser et al. |
| 6,940,446 B2 | 9/2005 | Cist |
| 6,944,546 B2 | 9/2005 | Xiao et al. |
| 6,961,663 B2 | 11/2005 | Sinclair et al. |
| 6,985,814 B2 | 1/2006 | McElhinney |
| 7,013,991 B2 | 3/2006 | Wilson-Langman et al. |
| 7,019,528 B2 | 3/2006 | Bittar |
| 7,038,455 B2 | 5/2006 | Beste et al. |
| 7,046,009 B2 | 5/2006 | Itskovich |
| 7,046,010 B2 | 5/2006 | Hu et al. |
| 7,098,664 B2 | 8/2006 | Bittar et al. |
| 7,098,858 B2 | 8/2006 | Bittar et al. |
| 7,123,016 B2 | 10/2006 | Larsen |
| 7,138,803 B2 | 11/2006 | Bittar |
| 7,143,844 B2 | 12/2006 | Alft et al. |
| 7,171,310 B2 | 1/2007 | Haugland |
| 7,227,363 B2 | 6/2007 | Gianzero et al. |
| 7,265,552 B2 | 9/2007 | Bittar |
| 7,268,019 B2 | 9/2007 | Golla et al. |
| 7,296,462 B2 | 11/2007 | Gregory et al. |
| 7,301,223 B2 | 11/2007 | Rodney et al. |
| 7,336,222 B2 | 2/2008 | Praskovsky et al. |
| 7,345,487 B2 | 3/2008 | Bittar et al. |
| 7,350,568 B2 | 4/2008 | Mandal et al. |
| 7,366,616 B2 * | 4/2008 | Bennett et al. ............ 702/9 |
| 7,425,830 B2 | 9/2008 | Banning et al. |
| 7,425,831 B2 | 9/2008 | Banning et al. |
| 7,427,863 B2 | 9/2008 | Bittar |
| 7,557,579 B2 | 7/2009 | Bittar |
| 7,557,580 B2 | 7/2009 | Bittar |
| 7,612,565 B2 | 11/2009 | Seydoux et al. |
| 7,659,722 B2 | 2/2010 | Bittar |
| 7,746,078 B2 | 6/2010 | Bittar et al. |
| 7,775,276 B2 | 8/2010 | Pelletier et al. |
| 7,786,733 B2 | 8/2010 | Seydoux et al. |
| 7,825,664 B2 | 11/2010 | Homan et al. |
| 7,839,148 B2 | 11/2010 | Vehra et al. |
| 7,839,346 B2 | 11/2010 | Bittar et al. |
| 7,924,013 B2 | 4/2011 | Seydoux et al. |
| 7,948,238 B2 | 5/2011 | Bittar |
| 7,982,464 B2 | 7/2011 | Bittar et al. |
| 8,016,053 B2 | 9/2011 | Menezes et al. |
| 8,030,937 B2 | 10/2011 | Hu et al. |
| 8,055,448 B2 * | 11/2011 | Mathiszik et al. ............ 702/11 |
| 8,063,641 B2 * | 11/2011 | Clark et al. ............ 324/345 |
| 8,085,049 B2 | 12/2011 | Bittar et al. |
| 8,085,050 B2 | 12/2011 | Bittar et al. |
| 8,174,265 B2 | 5/2012 | Bittar et al. |
| 8,307,915 B2 * | 11/2012 | Clark et al. ............ 175/62 |
| 2001/0022238 A1 | 9/2001 | Houwelingen et al. |
| 2001/0022464 A1 | 9/2001 | Seear |
| 2002/0101242 A1 | 8/2002 | Bittar |
| 2003/0051914 A1 | 3/2003 | Bittar |
| 2003/0056982 A1 | 3/2003 | Fayard et al. |
| 2003/0090424 A1 | 5/2003 | Brune et al. |
| 2003/0223620 A1 | 12/2003 | Anxionnaz et al. |
| 2004/0019427 A1 | 1/2004 | San Martin et al. |
| 2004/0027131 A1 | 2/2004 | Bittar |
| 2004/0056816 A1 | 3/2004 | Bittar et al. |
| 2004/0059513 A1 | 3/2004 | Bittar et al. |
| 2004/0059514 A1 | 3/2004 | Bittar et al. |
| 2005/0024060 A1 | 2/2005 | Bittar |
| 2005/0075789 A1 | 4/2005 | Xiao et al. |
| 2005/0099184 A1 | 5/2005 | Gianzero et al. |
| 2005/0134279 A1 | 6/2005 | Hu et al. |
| 2005/0134280 A1 | 6/2005 | Bittar et al. |
| 2005/0150692 A1 | 7/2005 | Ballantyne et al. |
| 2005/0211469 A1 | 9/2005 | Kuckes et al. |
| 2005/0230107 A1 | 10/2005 | McDaniel et al. |
| 2006/0022887 A1 | 2/2006 | Bittar |
| 2006/0033502 A1 | 2/2006 | Bittar |
| 2006/0061364 A1 | 3/2006 | Banning et al. |
| 2006/0157277 A1 | 7/2006 | Bittar et al. |
| 2006/0173624 A1 | 8/2006 | Frenkel |

(56) References Cited

U.S. PATENT DOCUMENTS

| | | | |
|---|---|---|---|
| 2006/0175057 A1 | 8/2006 | Mandal et al. | |
| 2006/0244455 A1 | 11/2006 | Bittar | |
| 2006/0255811 A1 | 11/2006 | Bittar et al. | |
| 2007/0079989 A1 | 4/2007 | Bankston et al. | |
| 2007/0126426 A1* | 6/2007 | Clark et al. | 324/326 |
| 2007/0137854 A1 | 6/2007 | Homan et al. | |
| 2007/0205021 A1 | 9/2007 | Pelletier et al. | |
| 2007/0229082 A1 | 10/2007 | Vehra et al. | |
| 2007/0235225 A1 | 10/2007 | Bittar | |
| 2008/0000686 A1 | 1/2008 | Kuckes et al. | |
| 2008/0078580 A1 | 4/2008 | Bittar | |
| 2008/0224707 A1 | 9/2008 | Wisler et al. | |
| 2008/0252296 A1 | 10/2008 | Hu et al. | |
| 2008/0258733 A1 | 10/2008 | Bittar | |
| 2008/0278169 A1 | 11/2008 | Bittar et al. | |
| 2008/0315884 A1 | 12/2008 | Bittar et al. | |
| 2009/0015260 A1 | 1/2009 | Bittar | |
| 2009/0178850 A1* | 7/2009 | Waters et al. | 175/45 |
| 2009/0224764 A1 | 9/2009 | Bittar | |
| 2009/0229826 A1 | 9/2009 | East, Jr. et al. | |
| 2009/0230968 A1 | 9/2009 | Bittar et al. | |
| 2009/0277630 A1 | 11/2009 | McDaniel et al. | |
| 2009/0278543 A1 | 11/2009 | Beste et al. | |
| 2009/0302851 A1 | 12/2009 | Bittar et al. | |
| 2009/0309600 A1 | 12/2009 | Seydoux et al. | |
| 2009/0309798 A1 | 12/2009 | Bittar et al. | |
| 2009/0315563 A1 | 12/2009 | Fox et al. | |
| 2010/0004866 A1 | 1/2010 | Rabinovich et al. | |
| 2010/0012377 A1 | 1/2010 | Sharp et al. | |
| 2010/0117655 A1 | 5/2010 | Bittar | |
| 2010/0123462 A1 | 5/2010 | Bittar | |
| 2010/0127708 A1 | 5/2010 | Bittar | |
| 2010/0134111 A1 | 6/2010 | Itskovich | |
| 2010/0155142 A1* | 6/2010 | Thambynayagam et al. | 175/61 |
| 2010/0156424 A1 | 6/2010 | Bittar et al. | |
| 2010/0176812 A1 | 7/2010 | Bittar et al. | |
| 2010/0262370 A1 | 10/2010 | Bittar et al. | |
| 2010/0284250 A1 | 11/2010 | Cornish et al. | |
| 2011/0006773 A1 | 1/2011 | Bittar | |
| 2011/0088890 A1* | 4/2011 | Clark | 166/66.5 |
| 2011/0175899 A1 | 7/2011 | Bittar et al. | |
| 2011/0180327 A1 | 7/2011 | Bittar et al. | |
| 2011/0186290 A1 | 8/2011 | Roddy et al. | |
| 2011/0187556 A1 | 8/2011 | Roddy et al. | |
| 2011/0192592 A1 | 8/2011 | Roddy et al. | |
| 2011/0199228 A1 | 8/2011 | Roddy et al. | |
| 2011/0221443 A1 | 9/2011 | Bittar et al. | |
| 2011/0234230 A1 | 9/2011 | Bittar et al. | |
| 2011/0298461 A1 | 12/2011 | Bittar et al. | |
| 2011/0308794 A1 | 12/2011 | Bittar et al. | |
| 2011/0308859 A1* | 12/2011 | Bittar et al. | 175/45 |
| 2011/0309833 A1 | 12/2011 | Yang | |
| 2011/0309836 A1 | 12/2011 | Bittar et al. | |
| 2012/0001637 A1 | 1/2012 | Bittar et al. | |
| 2012/0024600 A1 | 2/2012 | Bittar et al. | |
| 2012/0025834 A1 | 2/2012 | Minerbo et al. | |
| 2012/0133367 A1 | 5/2012 | Bittar et al. | |
| 2012/0199394 A1* | 8/2012 | Bittar et al. | 175/45 |
| 2013/0126240 A1* | 5/2013 | Johnston et al. | 175/45 |

FOREIGN PATENT DOCUMENTS

| | | |
|---|---|---|
| GB | 2030414 | 4/1980 |
| GB | 2352259 | 1/2001 |
| GB | 2441033 | 2/2008 |
| JP | 4001392 | 1/1992 |
| JP | 8094737 | 4/1996 |
| WO | WO-98/45733 | 10/1998 |
| WO | WO-00/00852 | 1/2000 |
| WO | WO-01/48353 | 7/2001 |
| WO | WO-03/080988 | 10/2003 |
| WO | WO-2006/079154 | 8/2006 |
| WO | WO-2007/145859 | 12/2007 |
| WO | WO-2008/154679 | 12/2008 |
| WO | WO-2009/014882 | 1/2009 |
| WO | WO-2010/005902 | 1/2010 |
| WO | WO-2010/005907 | 1/2010 |
| WO | WO-2010/006302 | 1/2010 |
| WO | WO-2010/065208 | 6/2010 |
| WO | WO-2010/075237 | 7/2010 |
| WO | WO-2011049828 | 4/2011 |
| WO | WO-2011/129828 | 10/2011 |
| WO | WO-2012/005737 | 1/2012 |
| WO | WO2012/005737 | 1/2012 |
| WO | WO-2012/008965 | 1/2012 |
| WO | WO-2012/064342 | 5/2012 |

OTHER PUBLICATIONS

Bittar, Michael S. et al., "Improved Casing Detection Tools and Methods", PCT Appl No. PCT/US2011/048317, 31 pgs.

Bittar, Michael S., "Processing and Geosteering with a Rotating Tool", PCT Application No. PCT/US10/31243; filed Apr. 15, 2010, 48 pgs.

Callaghan, G. "HFSS Modeling of Cross-Coupling in Borehole Radar", The Institution of Electrical Engineers, printed and published by IEEE, 2002, pp. 217-221.

Daniels, David J., "Surface-Penetrating Radar", Electronics & Communication Engineering Journal, Aug. 1996, pp. 165-182.

Gianzero, Stanley et al., "Method and Apparatus Having Antennas Configured to Measure Electrical Anisotropy", U.S. Appl. No. 10/173,528, filed Jun. 17, 2002, 24 pgs.

Gianzero, Stanley et al., "Method and Apparatus Having Antennas Configured to Measure Electrical Anisotropy", U.S. Appl. No. 10/957,415, filed Oct. 1, 2004, 27 pgs.

Halliburton Energy Services, Inc, "Signal Processing Methods for Steering to an Underground Target", PCT Application No. PCT/US11/27353; filed Mar. 7, 2011, 43 pages.

Halliburton Energy Services, Inc., 2010-IP-037510 PCT Application, dated Feb. 7, 2012, Appl No. Unknown, "Signal Processing Methods for Steering to an Underground Target", filed Unknown, 46 pgs.

Halliburton Energy Services, Inc., 2011-IP-044039 U1 US Application, dated Feb. 7, 2012, U.S. Appl. No. 13/101,889, "Methods and Systems for Determining Formation Parameters Using a Rotating Tool Equipped with Tilted Antenna Loops", filed May 5, 2011, 55 pgs.

Liu, Sixin et al., "Application of Borehole Radar for Subsurface Physical Measurement", Nanjing Institute of Geophysical Prospecting and Institute of Physics Publishing, J. Geophys. Eng. 1 (2004), pp. 221-227.

Liu, Sixin et al., "Electromagnetic Logging Technique Based on Borehole Radar", IEEE Transactions on Geoscience and Remote Sensing, vol. 40, No. 9, Sep. 2002, pp. 2083-2092.

PCT Application, dated Jun. 25, 2012, Appl No. PCT/US2012/043943, "Tilted Antenna Logging Systems and Methods Yielding Robust Measurement Signals", filed Jun. 25, 2012, 20 pgs.

PCT International Search Report and Written Opinion, dated Aug. 27, 2010, Appl No. PCT/US10/40447, "Method and Apparatus for Sensing Elongated Subterranean Anomalies", filed Jun. 29, 2010, 9 pgs.

Van Dongen, Koen W., et al., "A Directional Borehole Radar System", Subsurface Sensing Technologies and Applications, vol. 3, No. 4, Oct. 2002, pp. 327 346.

* cited by examiner

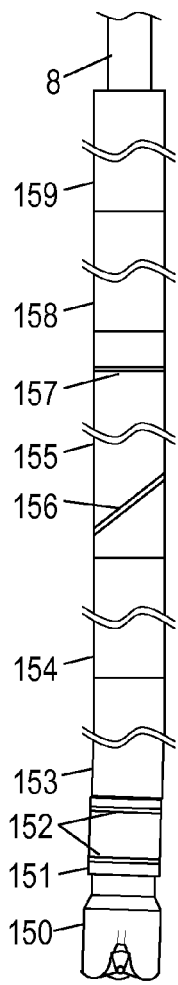
FIG. 5
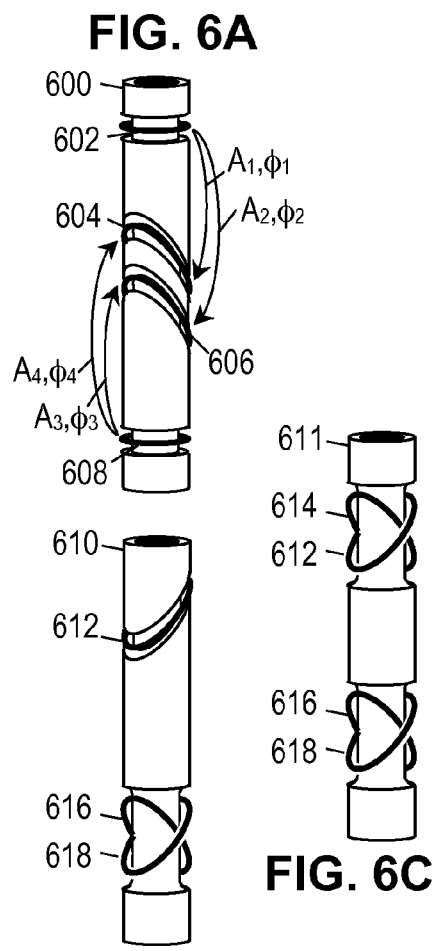
FIG. 6A
FIG. 6B
FIG. 6C
FIG. 6D
FIG. 6E
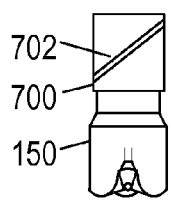
FIG. 7A
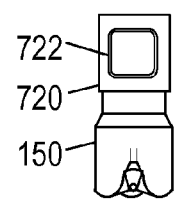
FIG. 7C
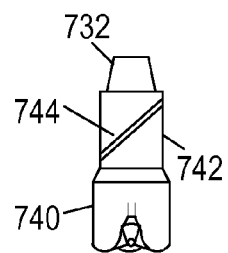
FIG. 7E
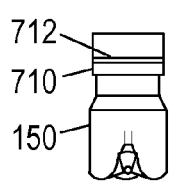
FIG. 7B
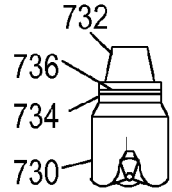
FIG. 7D
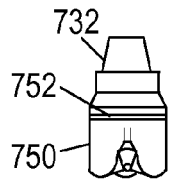
FIG. 7F

FIG. 11
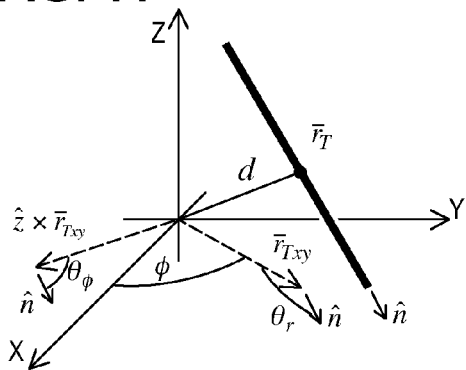
FIG. 12
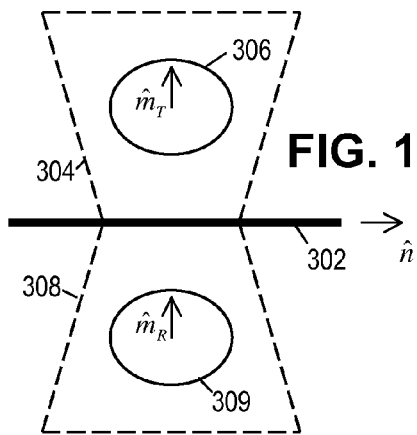
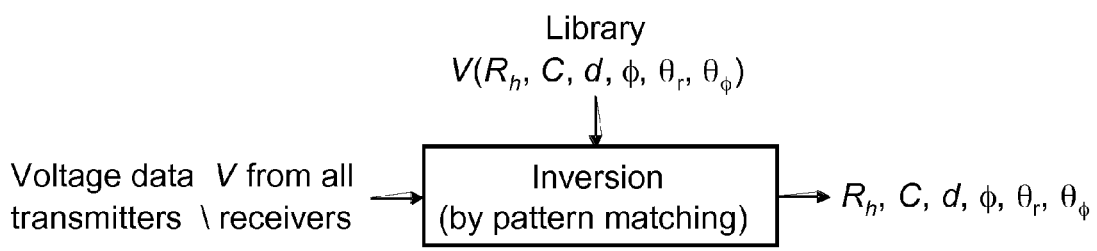
FIG. 13A
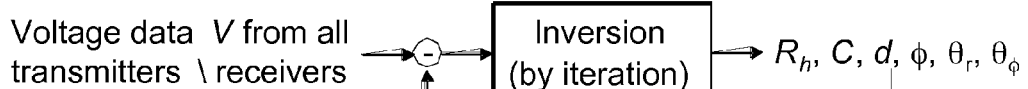
FIG. 13B
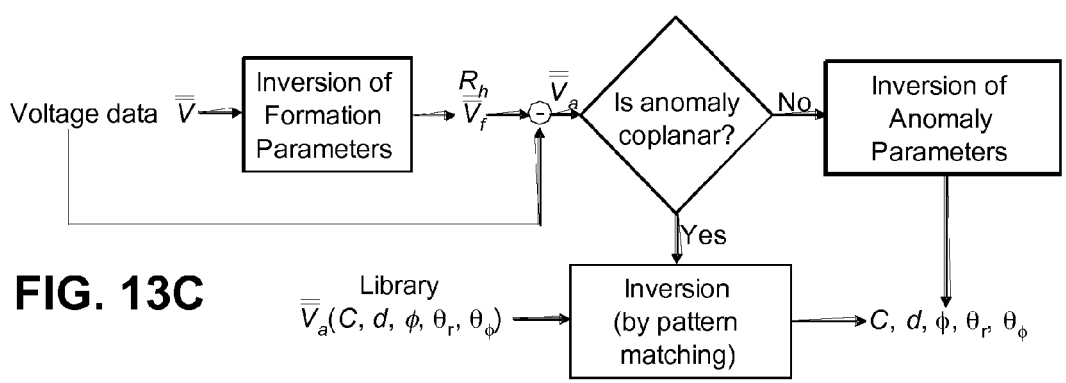
FIG. 13C

METHOD AND APPARATUS FOR SENSING ELONGATED SUBTERRANEAN ANOMALIES

BACKGROUND

In the oilfield, it is often desirable to drill a new borehole in close proximity to an existing well. For example, oil well blowouts can often be "killed" by intersecting the blowing well with a new borehole containing a heavy fluid. The heavy fluid flows from the new well into the existing well bore to suppress any upward flows, thereby halting the blowout and making it possible to cap the original well head. In another example, certain oilfield production techniques (e.g., steam-assisted gravity drainage) employ generally parallel boreholes that are closely spaced together. To generate this configuration, an existing well is used as a reference to guide the drilling of the new, parallel borehole. In yet another example, offshore drillers need to drill many long-reach wells from a single platform. The steering techniques employed often require surprisingly complex paths to direct the wells to the desired formations without violating bending limits of the drill string. Drillers must carefully steer new boreholes clear of the existing wells.

Various techniques have been developed for steering new boreholes relative to existing wells. The earliest approach used for this type of problem employs two separate tools in the existing well and new borehole. See, e.g., U.S. Pat. Nos. 3,406,766 ("Method and devices for interconnecting subterranean boreholes" to H. J. Keller); 4,593,770 ("Method for preventing the drilling of a new well into one of a plurality of production wells" to G. L. Hoehn Jr.); 5,343,152 ("Electromagnetic homing system using MWD and current . . . injected at a target well" to A. F. Kuckes); and 5,676,212 ("Downhole electrode for well guidance system" to A. F. Kuckes). Although this approach has been successful and used widely, it necessitates a stop in the production, so that a wireline tool can be lowered to the existing well.

Another type of approach that eliminates that requirement is to use magnetization of the target well casing such as described in U.S. Pat. Nos. 4,072,200 ("Surveying of subterranean magnetic bodies from an adjacent off-vertical borehole" to F. J. Morris et al.); 4,458,767 ("Method for directionally drilling a first well to intersect a second well" to G. L. Hoehn Jr.); and 6,985,814 ("Well twinning techniques in borehole surveying" to G. McElhinney). Since the source is a passive, this latter approach eliminates the requirement for a transmitter. However very strong magnetization levels at the well casing must be maintained to utilize this kind of an approach, often making it infeasible.

Yet another approach is to stop the drilling and lower a wireline tool to sense the casing remotely as in U.S. Pat. No. 4,791,373 ("Subterranean target location by measurement of time-varying magnetic field vector in borehole" to A. F. Kuckes). Although this approach is being successfully employed in the industry, it requires the drilling equipment to be pulled up, the wireline tool run down, and the drilling tool deployed back down, resulting in an undesirable loss of time. U.S. Pat. No. 4,443,762 ("Method and apparatus for detecting the direction and distance to a target well casing" to A. F. Kuckes) describes a logging while drilling tool for detecting well casings, but its construction sharply limits the range and ability to detect a wide range of orientations for the existing well.

In a nutshell, existing techniques have been found to have very limited range or to require multiple logging runs (either sequential runs in the new borehole or a run in the existing well in cooperation with a run in the new borehole). Such operations in the existing well are generally undesirable or in some cases impossible (e.g., in a blowout). Sequential runs in the new borehole undesirably disrupt and delay the drilling process. As such, existing techniques are believed to be inadequate.

BRIEF DESCRIPTION OF DRAWINGS

A better understanding of the various disclosed embodiments can be obtained when the following detailed description is considered in conjunction with the accompanying drawings, in which:

FIG. 5 shows an illustrative bottomhole assembly suitable for guided drilling;

FIGS. 6A-6E show illustrative electromagnetic logging tool embodiments;

FIGS. 7A-7F show illustrative at-bit antenna configurations;

FIG. 11 shows a parameterized relationship between a logging tool and an elongated anomaly;

FIG. 12 shows an illustrative co-planar relationship;

FIGS. 13A-13D are data flow diagrams for illustrative inversion methods;

DETAILED DESCRIPTION

Accordingly, there are disclosed herein various logging-while-drilling (LWD) systems and methods that provide resistivity logging coupled with deep detection of elongated anomalies at acute angles, enabling effective geosteering without disrupting drilling operations and without requiring intervention in the operations of the existing well. One LWD system embodiment employs a tool having tilted antennas as the transmitter and the receiver, where at least one of the antennas is placed in the vicinity of the bit, making it possible to detect existing wells at distances of 50-100 feet. In some cases, the detection distance is increased by enhancing the visibility of the existing well using a ferromagnetic fluid treatment on target well, either to fill the bore or to surround the well with treated cement or fluids that invade the formation.

Some disclosed geosteering system embodiments include a multi-component electromagnetic logging tool, a position and orientation tracking module, and a processing system. The processing system inverts the logging tool measurements to estimate, not only the position, but also the orientation of the existing well. At least one inversion method demonstrates improved performance by separating the inversion of formation parameters from the inversion of parameters specifying distance, direction, and orientation of a line representing the existing well.

Some of the disclosed geosteering method embodiments include: drilling a borehole with a steerable drilling assembly; collecting multi-component electromagnetic logging tool measurements; processing the measurements to determine a position and orientation of a line representing an existing well; and steering the drilling assembly based at least in part, on said position and orientation. Depending on the circumstances, the steering may include directing the drilling assembly along a path towards, away from, or parallel to the existing well. The measurement processing may include isolating the effect of the formation on the measurements, removing that effect to obtain measurements relating to the elongated anomaly, and inverting the elongated anomaly measurements to obtain estimates of the anomaly's distance, direction, and orientation.

Figure 1:
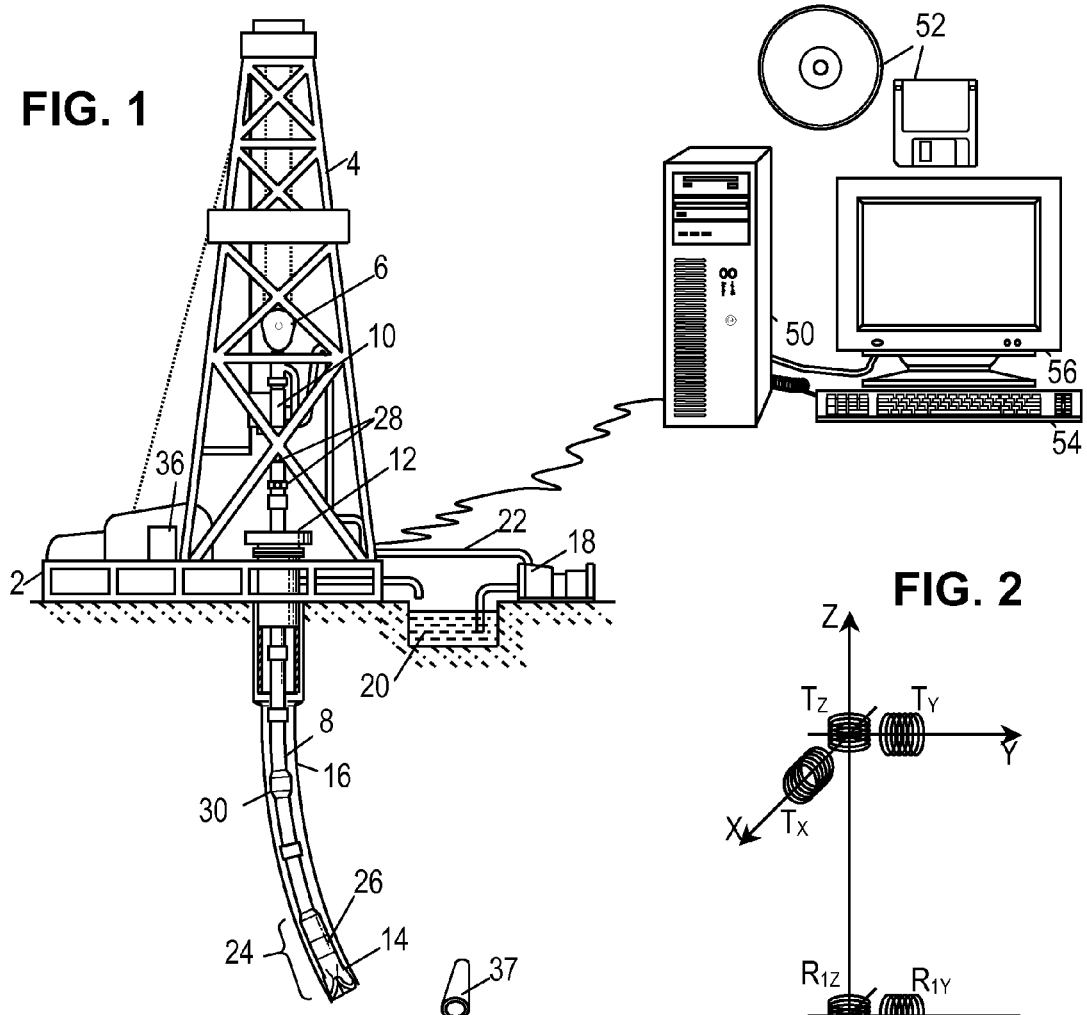
FIG. 1 shows an illustrative drilling environment in which electromagnetically-guided drilling may be employed.

The disclosed EM-guidance systems and methods are best understood in the context of the larger systems in which they operate. Accordingly, an illustrative geosteering environment is shown in FIG. 1. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. A pump 18 circulates drilling fluid 20 through a feed pipe 22, through the interior of the drill string 8 to drill bit 14. The fluid exits through orifices in the drill bit 14 and flows upward through the annulus around the drill string 8 to transport drill cuttings to the surface, where the fluid is filtered and recirculated.

The drill bit 14 is just one piece of a bottom-hole assembly 24 that includes a mud motor and one or more "drill collars" (thick-walled steel pipe) that provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

Also included in bottom hole assembly 24 is a telemetry sub that maintains a communications link with the surface. Mud pulse telemetry is one common telemetry technique for transferring tool measurements to surface receivers and receiving commands from the surface, but other telemetry techniques can also be used. For some techniques (e.g., through-wall acoustic signaling) the drill string 8 includes one or more repeaters 30 to detect, amplify, and re-transmit the signal. At the surface, transducers 28 convert signals between mechanical and electrical form, enabling a network interface module 36 to receive the uplink signal from the telemetry sub and (at least in some embodiments) transmit a downlink signal to the telemetry sub. A data processing system 50 receives a digital telemetry signal, demodulates the signal, and displays the tool data or well logs to a user. Software (represented in FIG. 1 as information storage media 52) governs the operation of system 50. A user interacts with system 50 and its software 52 via one or more input devices 54 and one or more output devices 56. In some system embodiments, a driller employs the system to make geosteering decisions and communicate appropriate commands to the bottom hole assembly 24. The driller can steer the drill bit 14 along a desired path relative to the existing well 37 using any one of various suitable directional drilling systems, including steering vanes, a "bent sub", and a rotary sleerable system. For precision steering, the steering vanes may be the most desirable steering mechanism. The steering mechanism can be alternatively controlled downhole, with a downhole controller programmed to avoid, intersect, or follow the existing well at a predetermined distance and position (e.g., directly above or below the existing borehole).

Figure 2:
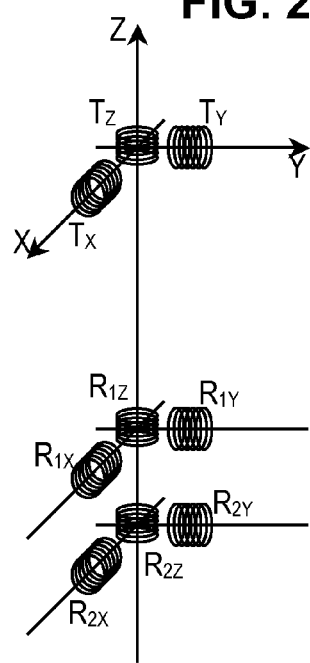
FIG. 2 shows an illustrative tool antenna configuration for multi-component measurements.

The measurements needed for geosteering can be gathered using an electromagnetic logging tool that makes multi-component measurements. FIG. 2 shows an illustrative tool antenna configuration for one such tool. The tool includes a triad of transmitter coils $T_X$, $T_Y$ and $T_Z$, each oriented along a respective tool axis. (The longitudinal axis of the tool is traditionally taken as the Z-axis. The X-axis is drawn through the front or "face" of the tool, and the Y-axis is orthogonal to the other two.) The tool further includes at least one triad of similarly oriented receiver coils $R_{1X}$, $R_{1Y}$, and $R_{1Z}$. Tools that measure attenuation or phase shift relative to the original transmit signal (sometimes called "absolute" measurements) only require one receiver triad. However, a second triad of similarly oriented receiver coils pairs $R_{2X}$, $R_{2Y}$, and $R_{2Z}$ may also provided when differential measurements are desired (e.g., attenuation or phase shift between receivers oriented along a given axis). Differential measurements offer increased spatial resolution. The use of multiple receivers also enables inversion of a larger number of unknowns and enables a single tool to provide logs at different resolutions.

Moran and Gianzero, in "Effects of Formation Anisotropy on Resistivity Logging Measurements" Geophysics, Vol. 44, No. 7, p. 1266 (1979), noted that the magnetic field h in the receiver coils can be represented in terms of the magnetic moments m at the transmitters and a coupling matrix C:

$$h = Cm \tag{1}$$

In express form, equation (1) is:

$$\begin{bmatrix} H_x \\ H_y \\ H_z \end{bmatrix} = \begin{bmatrix} C_{xz} & C_{xy} & C_{xz} \\ C_{yx} & C_{yy} & C_{zz} \\ C_{zx} & C_{zy} & C_{zz} \end{bmatrix} \begin{bmatrix} M_x \\ M_y \\ M_z \end{bmatrix}, \tag{2}$$

where $M_X$, $M_Y$, and $M_Z$ are the magnetic moments (proportional to transmit signal strength) created by transmitters $T_X$, $T_Y$, and $T_Z$, respectively, $H_X$, $H_Y$, $H_Z$ are the magnetic fields (proportional to receive signal strength) at the receiver antennas $R_X$, $R_Y$, and $R_Z$, respectively.

In the antenna configuration of FIG. 2, if each transmitter is fired in turn, and signal measurements are made at each receiver in response to each firing, nine absolute or differential measurements are obtained. These nine measurements enable the determination of a complete coupling matrix C. ($C_{IJ}=a_{IJ}V_{IJ}$, where I is the index for receiver $R_X$, $R_Y$, or $R_Z$, J is the index for transmitter $T_X$, $T_Y$, or $T_Z$, $a_{IJ}$ is a constant determined by the tool design, and $V_{IJ}$ is a complex value representing the signal amplitude (or attenuation) and phase shift measured by receiver I in response to the firing of transmitter J.) Knowledge of the complete coupling matrix enables the determination of various parameters including formation dip angle, strike angle, vertical resistivity, and horizontal resistivity; and/or distance, direction and relative orientation of a nearby well.

Figure 3:
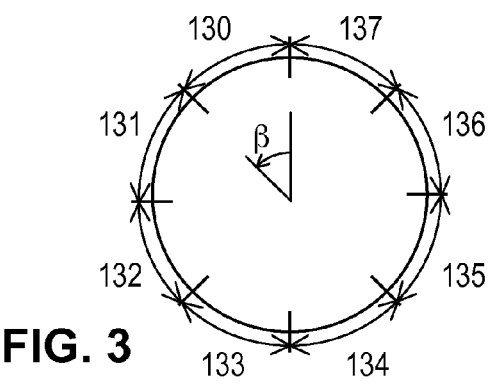
FIG. 3 shows a borehole cross-section divided into azimuthal sectors.

The tool's motion adds a layer of complexity to the system. As shown in FIG. 3, the borehole's circumference can be divided into a set of angular sectors 130-137. In FIG. 3, eight sectors are shown, but the number of sectors can vary based on the measurement resolution. It is expected that the number of sectors will be in the range between 4 and 128. Each sector is associated with a corresponding range of tool orientations. The length of the borehole can be similarly divided into segments based on the vertical resolution of the tool. The segment information can be combined with the sector information to divide the borehole wall into a cylindrical grid of "bins".

During drilling operations, the logging tool rotates and gradually progresses along the length of the borehole. Internal instruments track the tool's position and rotational orientation, enabling the each of the tool's coupling matrix measurements to be associated with a corresponding bin. As die tool can make many measurements for each bin, some tool embodiments will combine the measurements in each bin to obtain an average measurement for the bin. It may be these combined measurements that are inverted to obtain formation resistivity and distance, direction, and orientation information relative to the existing well.

Figure 4:
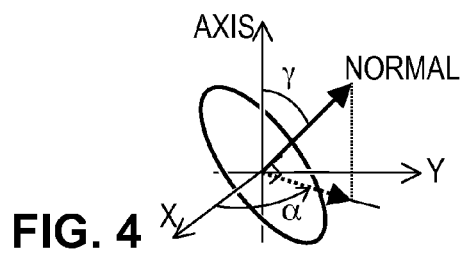
FIG. 4 shows a coordinate system for specifying antenna tilt.

The triad antenna configuration shown in FIG. 2 presents some implementation difficulties in a logging while drilling tool. Because it is possible to reconstruct the coupling matrix values from measurements of more-easily implemented tilted antennas, the inventors expect electromagnetic geosteering tools will employ one or more tilted antennas. FIG. 4 shows an example of how the orientation of such tilted antennas can be specified. Coil antennas generate a magnetic dipole moment perpendicular to the plane of the antenna (when transmitting) or exhibit a magnetic dipole pattern of sensitivity perpendicular to the plane of the antenna (when receiving). The orientation of the antenna can thus be specified by providing a tilt angle γ of the normal vector relative to the tool axis and an azimuth angle α between the X-axis and the projection of the normal onto the X-Y plane. In most of the examples that follow, all of the tilted antennas have the same azimuth (e.g., 0 degrees) and tilt angles of approximately +45° or −45°. However, it is understood that other orientations and tilt angles would also be suitable.

FIG. 5 shows an illustrative bottom hole assembly having a drill bit 150 seated in a bit box 151 at the end of a "bent sub" 153. A mud motor 154 is connected to the bent sub 153 to turn an internal driveshaft extending through the bent sub to the bit box 151. The bottom hole assembly further includes a logging while drilling (LWD) assembly 155 and a telemetry sub 159, along with other optional drill collars 158 suspended from a string of drill pipe 8.

The drill bit shown in FIG. 5 is a roller cone bit, but other bit types can be readily employed. Most drill bits have a threaded pin 732 (FIGS. 7D-7F) that engages a threaded socket in a bit box 151 to secure the bit to the drill string. In the illustrative embodiment of FIG. 5, the bit box is provided with two loop antennas 152 that work cooperatively with antennas 156, 157 in the LWD assembly 155. The inclusion of an at-bit antenna in the antenna, arrangement enables azimuthal resistivity measurements to be made in close proximity to the bit. The bit box 151 is turned by mud motor 154 via the drive shaft passing through the bent sub 153, which is a short section that is slightly bent to enable the drill bit to drill a curved hole when the bit is turned only by the mud motor (i.e., without rotation of the drill string 8). Various types of mud motors can be employed for geosteering, e.g., positive displacement motors (PDM), Moineau motors, turbine-type motors and the like, and those motors employing rotary steerable mechanisms.

LWD assembly 155 includes one or more logging tools and systems capable of recording data as well as transmitting data to the surface via the telemetry sub 159. As specifically discussed below, the LWD assembly 155 includes a resistivity tool having antennas 156, 157 that work cooperatively with (optional) antennas near the bit to determine azimuthal resistivity measurements helpful for geosteering. Because of the length of the mud motor, the resistivity tool sensors located in the LWD section are at least 15 feet from the drilling bit, which would normally imply that the azimuthal resistivity measurements available to the driller apply to a drill bit position at least 15 feet behind the current drill bit position. However, with the cooperation of the at-bit loop antennas, the driller can be provided information applicable to the current drill bit position, making it possible to steer the drilling assembly much more precisely than before.

FIGS. 6A-6D show illustrative electromagnetic logging tool embodiments having antenna configurations that enable measurement of coupling matrix values (See, e.g., U.S. patent application Ser. No. 12/294,557, "Antenna Coupling Component Measurement Tool Having a Rotating Antenna Configuration" by Bittar and Hu, which is hereby incorporated herein by reference). FIG. 6A shows an illustrative tool 600 having a pair of parallel tilted receiver antennas 604 and 606, with a pair of parallel co-axial transmitter antennas 602 and 608 equally spaced from the midpoint of the receiver antennas. As the tool rotates, the four measured attenuations and phase shifts vary in a manner that enables at least three coupling matrix components to be determined. Moreover, the "opposed" transmitter configuration (with transmitters on opposite sides of the receiver array midpoint) enables the signal processing to automatically compensate for parameter variations of the internal circuitry.

FIG. 6B shows an illustrative tool 610 having a single tilted transmitter antenna 612 and two oppositely-tilted receiver antennas 616, 618, one of which is parallel to the transmitter antenna, and the other of which is perpendicular to the transmitter antenna. This configuration enables at least five of the coupling matrix components to be determined from the measurements made as the tool rotates.

FIG. 6C shows an illustrative tool 611 having two co-located transmitters 612, 614 and two co-located receivers 616, 618. The transmitter antennas are tilted in opposite directions, as are the receiver antennas. This tool configuration may be preferred because it enables all nine of the coupling matrix components to be found.

Tool 611 has several variations including those shown in FIGS. 6D and 6E. FIG. 6D shows an illustrative tool 620 that offers measurements with different transmitter-receiver spacings. Tool 620 includes crossed receiver antenna coils 623 and 624 midway between a first set of parallel transmitter coils 621, 622 and a second set of parallel transmitter coils 625, 626 with a tilt angle that is opposite that of coils 621, 622. FIG. 6E shows another tool embodiment 630 in which the transmitter coils in the first set 631, 632 and the transmitter coils in the second set 635, 636 have the same tilt angle, but the parallel receiver coils 633, 634 have an opposite tilt angle. While these tools enable a full set of coupling components to be determined, it should be noted that the upper transmitters are interrogating a different region of the formation than the lower transmitters, and accordingly a depth-alignment step is needed to spatially align the resulting measurements before the coupling components are determined. Tool 611 (FIG. 6C) does not require such a depth-shifting operation because the tool measurements are already aligned.

It is further noted that in each of these embodiments, the roles of transmitter and receiver can be exchanged without affecting the operation of the tool. Any of the illustrated resistivity logging tools can be operated cooperatively with an at-bit antenna to provide deep measurements near the bit.

FIG. 5 shows two loop antennas 152 coaxial with the bit box 151 and axially spaced apart by, e.g., 15-30 cm. The advantage to placing antennas on the bit box is that this configuration does not require any modification of the drill bits, which are consumable items that need to be regularly replaced. Various alternative configurations are shown in FIGS. 7A-7F. FIG. 7A shows the drill bit 150 secured into a bit box 700 having a tilted loop antenna 702, i.e., a loop antenna having its axis set at an angle with respect to the axis of the bit box. If space allows, a second loop antenna may be provided parallel to the first. Conversely, if space is limited on the bit box, a single co-axial loop antenna 712 may be provided on the bit box 710 as shown in FIG. 7B. The loop antenna(s) does not necessarily need to encircle the bit box. For example. FIG. 7C shows a bit box 720 having a loop antenna 722 with an axis that is perpendicular to the long axis of the bottom hole assembly.

FIGS. 7D-7F show drill bits having embedded loop antennas. In FIG. 7D, drill bit 730 has a normal-length shaft 734 to support a co-axial loop antenna 736, which can be contrasted with drill bit 740 in FIG. 7E. Drill bit 740 has an elongated shaft 742 to support a tilted antenna 744. In FIG. 7F, a drill bit 750 is provided with a co-axial loop antenna 752 on its gauge surface. (Most bent sub and rotary steerable systems employ long gauge bits, i.e. bits having gauge surfaces that extend axially for 10 cm or more and conveniently provide space for embedding sensors in the bit surface.) Some embodiments employ the at-bit loop antennas as transmit antennas while other embodiments employ the at-bit antennas as receive antennas.

Figure 8:
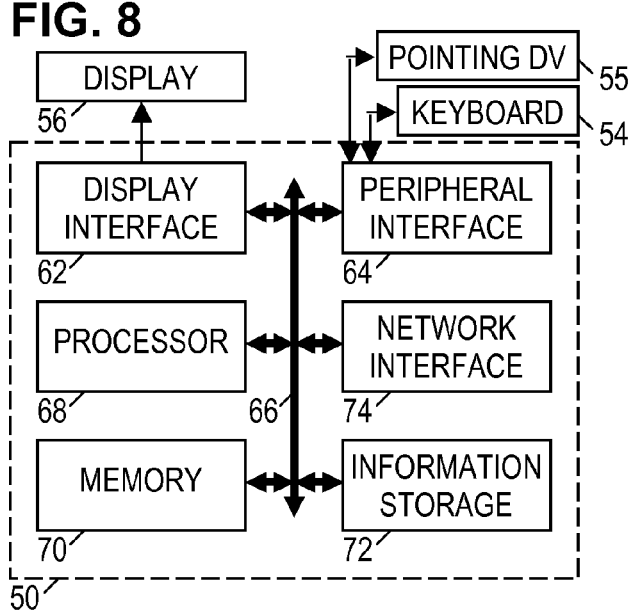
FIG. 8 is a block diagram of an illustrative steering control system.

FIG. 8 is a block diagram of an illustrative steering control system suitable for collecting, processing, and displaying electromagnetic logging data. In at least some embodiments, the system generates geosteering signals from the logging data measurements and displays them to a user. The user may interact with the system to send commands to the bottom hole assembly to adjust its operation in response to the received data. If desired, the system can be programmed to send such commands automatically in response to the logging data measurements, thereby enabling the system to serve as an autopilot for the drilling process.

The control system can take the form of a computer that includes a chassis 50, a display 56, and one or more input devices 54, 55. Located in the chassis 50 is a display interface 62, a peripheral interface 64, a bus 66, a processor 68, a memory 70, an information storage device 72, and a network interface 74. Bus 66 interconnects the various elements of the computer and transports their communications. The network interface 74 couples the system to telemetry transducers that enable the system to communicate with the bottom hole assembly. In accordance with user input received via peripheral interface 54 and program instructions from memory 70 and/or information storage device 72, the processor processes the received telemetry information received via network interface 74 to construct formation property logs and/or geosteering signals and display them to the user.

Figure 9:
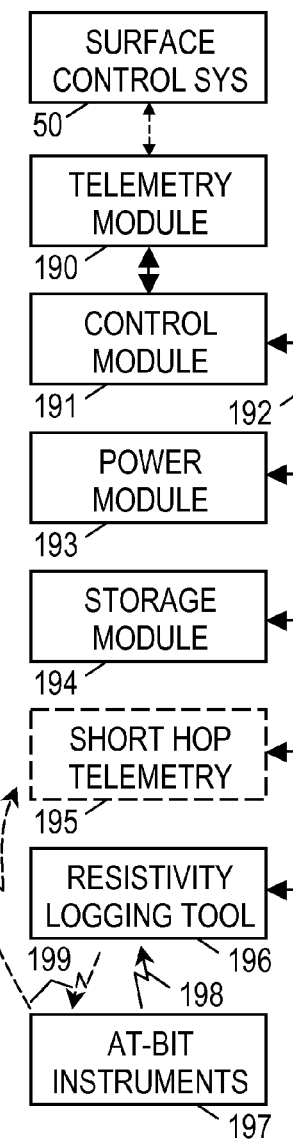
FIG. 9 is a block diagram of an illustrative bottomhole assembly.

FIG. 9 is a block diagram of illustrative electronics for a bottom-hole assembly. A telemetry module 190 communicates with control system 50 to provide logging data and to receive control messages for the LWD tools in the assembly and for steering the drilling assembly. A control module 191 for the LWD tool assembly provides the logging data and receives these control messages. The control module 191 coordinates the operation of the various components of the LWD tool assembly via a tool bus 192. These components include a power module 193, an information storage module 194, an optional short hop telemetry module 195, and an electromagnetic (resistivity) logging tool 196. In some embodiments, at-bit instruments 197 send electromagnetic signals 198 that are used by logging tool 196 to measure azimuthal resistivity. In other embodiments, logging tool 196 sends electromagnetic signals 199 that are measured by at-bit instruments 197 and communicated via short, hop telemetry module 195 to the logging tool 196 for azimuthal resistivity calculations. The control module 191 stores the magnetic coupling calculations in storage module 194 and communicates at least some of these calculations to the surface control system.

The bottomhole assembly control module 191 operates in accordance with one or more programs stored in internal memory. Similarly, processor 68 (FIG. 8) operates in accordance with one or more programs stored on an information storage medium (e.g., in information storage device 72). One or more of these programs configures the control module and/or processing system to carry out at least one of the logging and geosteering methods disclosed herein below.

Figure 10:
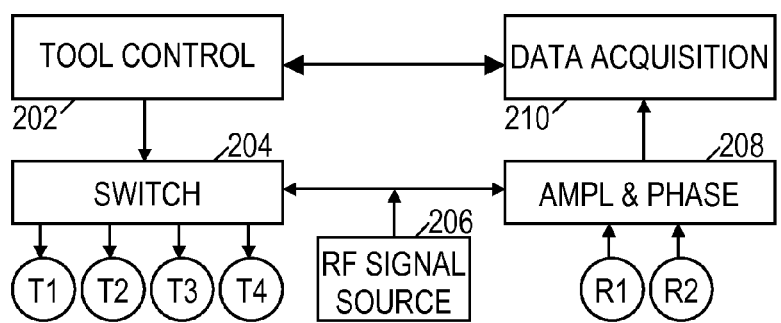
FIG. 10 is a block diagram of an illustrative electromagnetic logging tool.

FIG. 10 is a functional block diagram of the electronics of electromagnetic logging tool 196. The electronics include a control module 202 that is coupled to an analog switch 204. Analog switch 204 is configured to drive any one of the transmitter coils $T_1$, $T_2$, $T_3$, $T_4$ with an alternating current (AC) signal from a signal source 206. In at least some embodiments, the signal source provides signals with programmable frequencies in the range of $10^2$ to $10^7$ Hz. The control module 202 preferably selects a transmitter coil, pauses long enough for transients to die out, then signals data acquisition module 210 to obtain an amplitude and phase sample of the signals received by each of the receivers. The control module 202 preferably repeats this process sequentially for each of the transmitters. The amplitude and phase shift values are provided by amplitude and phase shift detector 208 which is coupled to each of the receiver coils $R_1$ and $R_2$ for this purpose.

Control module 202 may process the amplitude and phase shift measurements to obtain compensated measurements and/or measurement averages, or such processing can be performed by control module 191 (FIG. 9). The raw, compensated, or averaged measurements, may be transmitted to the surface for processing to determine, e.g., formation dip and strike angles, vertical and horizontal resistivity, distance to formation layer boundaries, distance to nearest existing well, direction of nearest existing well, and relative orientation of the nearest existing well. In at least some embodiments, the inversion is performed by comparing the measured receiver amplitudes and phases to a library of results, which is either synthesized via a mathematical formula or a computer algorithm, or obtained via experiments. For sake of simplicity, elongated anomaly and formation response libraries can be built separately, but used simultaneously in the inversion or processing phase. The processing and inversion can either be carried out in a processing unit within the tool body, or at the surface through a telemetry system. The results are finally communicated to an operator via a graphical device, or transmitted to a control mechanism or an algorithm that adjusts drilling parameters according to a set of rules.

FIG. 11 shows a parameterized model of the relationship between a multi-component electromagnetic logging tool and an existing well. This model has been successfully employed to invert tool measurements to obtain distance, direction, and relative orientation estimates. In the model, the origin of the coordinate system is located at the position of the tool's transmit antenna. (Depth-shifting can be employed to align measurements from different transmitters.) The existing well, sometimes referred to herein as an "elongated anomaly", is represented by a line which can be expressed in terms of an arbitrary point $\bar{x}_a$ on the line and a unit vector $\hat{n}$ parallel to the line. The arbitrary point selected for use in the present method is the point of closest approach to the origin, denoted in the figures as $\bar{r}_T$. This point of closest approach is at a distance d from the origin. The projection of $\bar{r}_T$ into the X-Y plane of the tool is denoted $\bar{r}_{Txy}$, and the projection defines an azimuth angle $\phi$ relative to the X-axis. The angle between projection $\bar{r}_{Txy}$ and unit vector $\hat{n}$ is denoted as $\theta_r$, while the angle between $\hat{z} \times \bar{r}_{Txy}$ and the unit vector $\hat{n}$ for the line is denoted as $\theta_{100}$. (Note that any parameterization which uniquely defines the relative position and orientation of the anomaly can be used in place of d, $\phi$, $\theta_r$ and $\theta_\phi$.)

Besides these four geometrical parameters (d,$\phi$,$\theta_r$,$\theta_\phi$), a complex-valued parameter C indicating the magnitude and phase of the currents induced in the existing well is also included. C is mainly based on the local or material properties of the anomaly such as diameter, thickness and conductivity. Also included is the formation resistivity $R_h$. In at least some embodiments, the tool measurements are inverted to obtain parameters $R_h$, C, d, $\phi$, $\theta_r$ and $\theta_\phi$ using the approach illustrated in FIGS. 13A-13B. In this case, the tool measurements (either as voltage amplitude and phase or as in-phase and quadrature phase components) associated with all transmitter-receiver combinations are supplied to the inversion algorithm. The inversion algorithm is either a pattern matching algorithm based on a pre-compiled library (FIG. 13A), or an iterative algorithm based on a forward model (FIG. 13B). In both cases all six parameters are inverted simultaneously.

Pattern-matching inversion (FIG. 13A) employs a library having an expected measurement vector for each set of parameter values in a given range. The inversion is accomplished by finding the expected measurement vector that is closest to the actual measurement vector and concluding that the associated parameter values are the correct ones. Various measures of "closeness" can be used, and in some embodiments, interpolation between a set of closest vectors can be used to refine the parameter value estimate.

Iterative inversion (FIG. 13B) employs a "forward model" that predicts the tool measurements for a given set of parameter values. Starting with a speculative estimate of the parameter values, the forward model determines the predicted tool measurements, which are then compared with the actual tool measurements. Based on the results of the comparison, the parameter value estimate is refined and the process is repeated until the predicted tool measurements converge with the actual tool measurements.

Inversion algorithms in FIGS. 13A-13B can be used in cases where either or both axial and azimuthal current patterns in the well-casing are observed. In cases where the well-casing is thin or located far enough, azimuthal components are negligible and only axial components are effective.

Figure 13D:
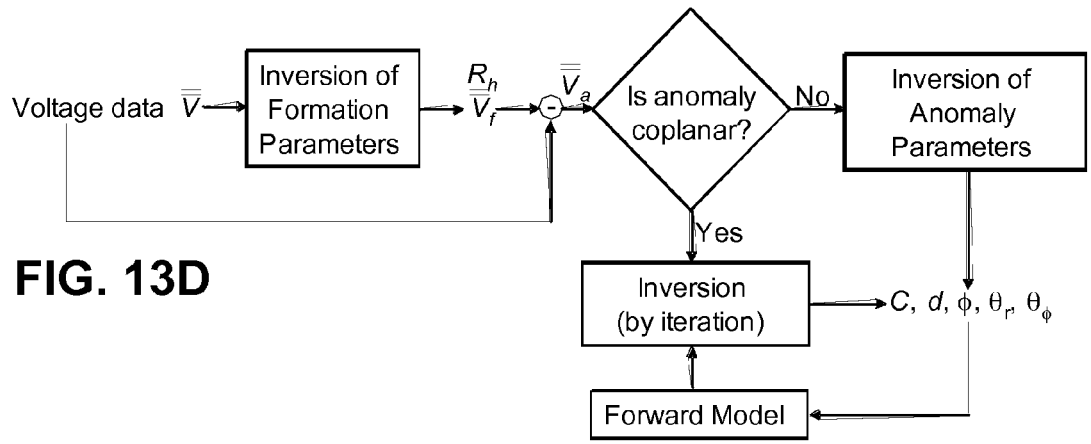

In this case, some efficiency gains are achievable using a tri-axial response matrix, which enables the inversion of formation and anomaly parameters to be decoupled as suggested in FIGS. 13C-13D. In this approach the tri-axial response of the tool is represented by a 3×3 voltage matrix V. V matrix can be decomposed into two parts where the first part is the contribution due to formation such as adjacent layers, and the second part is due to elongated anomaly:

$$\bar{V} = \bar{V}_f + \bar{V}_a \qquad (3)$$

For an anomaly that follows a linear shape in the locality where the tool exists, the voltage $V_a$ due to the anomaly can be written as $$\bar{V}_a = \begin{bmatrix} c_T(\hat{r}_T \times \hat{n}) \cdot \hat{x} \\ c_T(\hat{r}_T \times \hat{n}) \cdot \hat{y} \\ c_T(\hat{r}_T \times \hat{n}) \cdot \hat{z} \end{bmatrix} [ c_R(\hat{r}_R \times \hat{n}) \cdot \hat{x} \quad c_R(\hat{r}_R \times \hat{n}) \cdot \hat{y} \quad c_R(\hat{r}_R \times \hat{n}) \cdot \hat{z} ] \qquad (4)$$

Here $c_T$ is a complex-valued coefficient based on $R_h$ and C. $r_T$ and $r_R$ are the vectors connecting the closest point on the anomaly $\bar{x}_c$ to the transmitter and receiver, respectively. $\cdot$ operator is the vector inner-product and the × operator is the vector cross-product. Strictly speaking, this expression is valid only for a magnetic dipole tri-axial response matrix in homogeneous media, but it still yields useful results in certain inhomogeneous media.

Substituting (4) into (3), we can observe that $$\begin{aligned}\bar{V} &= \bar{V}_f + \bar{V}_a \\ &= \bar{V}_f + \begin{bmatrix} c_T(\hat{r}_T \times \hat{n}) \cdot \hat{x} \\ c_T(\hat{r}_T \times \hat{n}) \cdot \hat{y} \\ c_T(\hat{r}_T \times \hat{n}) \cdot \hat{z} \end{bmatrix} \\ &\quad [c_R(\hat{r}_R \times \hat{n}) \cdot \hat{x} \quad c_R(\hat{r}_R \times \hat{n}) \cdot \hat{y} \quad c_R(\hat{r}_R \times \hat{n}) \cdot \hat{z}] \\ \bar{V} - \bar{V}_f &= \begin{bmatrix} c_T(\hat{r}_T \times \hat{n}) \cdot \hat{x} \\ c_T(\hat{r}_T \times \hat{n}) \cdot \hat{y} \\ c_T(\hat{r}_T \times \hat{n}) \cdot \hat{z} \end{bmatrix} \\ &\quad [c_R(\hat{r}_R \times \hat{n}) \cdot \hat{x} \quad c_R(\hat{r}_R \times \hat{n}) \cdot \hat{y} \quad c_R(\hat{r}_R \times \hat{n}) \cdot \hat{z}] \\ &= \begin{bmatrix} (\hat{r}_T \times \hat{n}) \cdot \hat{x} & 0 & 0 \\ (\hat{r}_T \times \hat{n}) \cdot \hat{y} & 0 & 0 \\ (\hat{r}_T \times \hat{n}) \cdot \hat{z} & 0 & 0 \end{bmatrix} \begin{bmatrix} c_T c_R & 0 & 0 \\ 0 & 0 & 0 \\ 0 & 0 & 0 \end{bmatrix} \\ &\quad \begin{bmatrix} (\hat{r}_R \times \hat{n}) \cdot \hat{x} & (\hat{r}_R \times \hat{n}) \cdot \hat{y} & (\hat{r}_R \times \hat{n}) \cdot \hat{z} \\ 0 & 0 & 0 \\ 0 & 0 & 0 \end{bmatrix} \\ &= \bar{U} \bar{S} \bar{U}^{-1}\end{aligned} \qquad (5)$$

As it can be seen in (5), an eigenvalue-eigenvector decomposition of $\bar{V} - \bar{V}_f$ should produce only one non-zero eigenvalue. If we denote N independent $\bar{V}$ measurements as $\bar{V}^{(m)}$, m=1, ..., N, these measurements can be used to solve for $\bar{V}_f$ provided that $\bar{V}_f$ has at most 2N degrees of freedom. For example, in the case of isotropic homogeneous medium, there is only-one degree of freedom, $R_h$, associated with $\bar{V}_f$. In the case of anisotropic homogeneous medium, there are two degrees of freedom, which are the horizontal and vertical resistivity. More degrees of freedom can be obtained for models with multiple layers. As a result $\bar{V}_f$ can be stated as an optimization problem:

Find $\overline{\nabla}_f$ such that:

$$\overline{V}^{(m)} - \overline{V}_f = \overline{USU}^{-1} \quad (6)$$

and $$S_{22}, S_{33} = 0, \forall m = 1, \ldots, N$$

Due to low dimensional nature of this inversion problem, it can be solved with nearly any generic optimization algorithm, so details will not be included here.

After the inversion of formation voltage and parameters as expressed in equation (6) is complete, the anomaly voltage can be obtained by subtracting the formation voltage from the total voltage $\overline{V}_a = \overline{V} - \overline{V}_f$. Due to the form of the specified eigenvalue-eigenvector decomposition, the first column of the eigenvector matrix, $\hat{m}_T$, and first row of the inverse of the eigenvector matrix $\hat{m}_R$ can be written as follows $$\overline{V}_a = \overline{USU}^{-1}$$

$$\hat{m}_T = (\hat{r}_T \times \hat{n})$$

$$\hat{m}_R = (\hat{r}_R \times \hat{n})$$

$$\hat{m}_T = \overline{U}_1 \quad (7)$$

$$\hat{m}_R = \overline{W}_1$$

where $W = (U^{-1})^T$

Here $\hat{m}_T$ and $\hat{m}_R$ coincide with unit vectors that are normal to the planes that contain the anomaly and transmitter, and the anomaly and receiver, respectively. By applying geometrical methods and finding the intersection between these planes, it is possible to determine the line associated with the anomaly axis (see FIG. 12). Thus, $\hat{n}$ and $\overline{x}_a$ associated with the line can be expressed as:

$$\hat{n} = \hat{m}_T \times \hat{m}_R \quad (8)$$

$$\overline{x}_a: \text{ such that } \begin{bmatrix} \hat{m}_T^T \\ \hat{m}_R^T \end{bmatrix} \overline{x}_a = \begin{bmatrix} \hat{m}_T \cdot \overline{x}_T \\ \hat{m}_R \cdot \overline{x}_R \end{bmatrix}$$

Calculation of parameters d, $\phi$, $\theta_r$, and $\theta_\phi$ from $\hat{n}$ and $\overline{x}_a$ is a straightforward geometrical exercise. When tool and anomaly are coplanar, $\hat{m}_T$ and $\hat{m}_R$ vectors are parallel, so the planes do not intersect. In this case, a more general inversion algorithm based on pattern matching or iterations with a forward model would be used. Using sensors that indicate the position and orientation of the logging tools, a transformation can be applied to the calculated parameters to convert from the tool coordinate system (where the z-axis corresponds to the tool axis) to the earth coordinate system (where the z-axis is opposite the direction of gravity). It may be these transformed parameters that are provided to the user.

The tool's range can be improved by providing a high contrast between the electromagnetic parameters of the elongated anomaly and the formation. If the existing well is uncased, it could be filled with a contrast fluid, e.g., a fluid having conductive, inductive, or magnetic properties that contrast with the formation. Ferromagnetic fluids may be particularly suitable. Ferromagnetic fluids comprised of suspended magnetic particles in a carrier medium offer extraordinary electromagnetic properties. In particular, specific ferromagnetic fluids can provide very high magnetic susceptibility values to create a high contrast with respect to the surrounding medium, even in the presence of casing. If desired, the contrast fluid can be placed in a limited portion of the existing well to create a target region. This can be achieved, for example, by using the contrast fluid in well completion. The contrast fluid can penetrate deep into the formation to form a wide cylindrical zone of high contrast.

Figure 14:
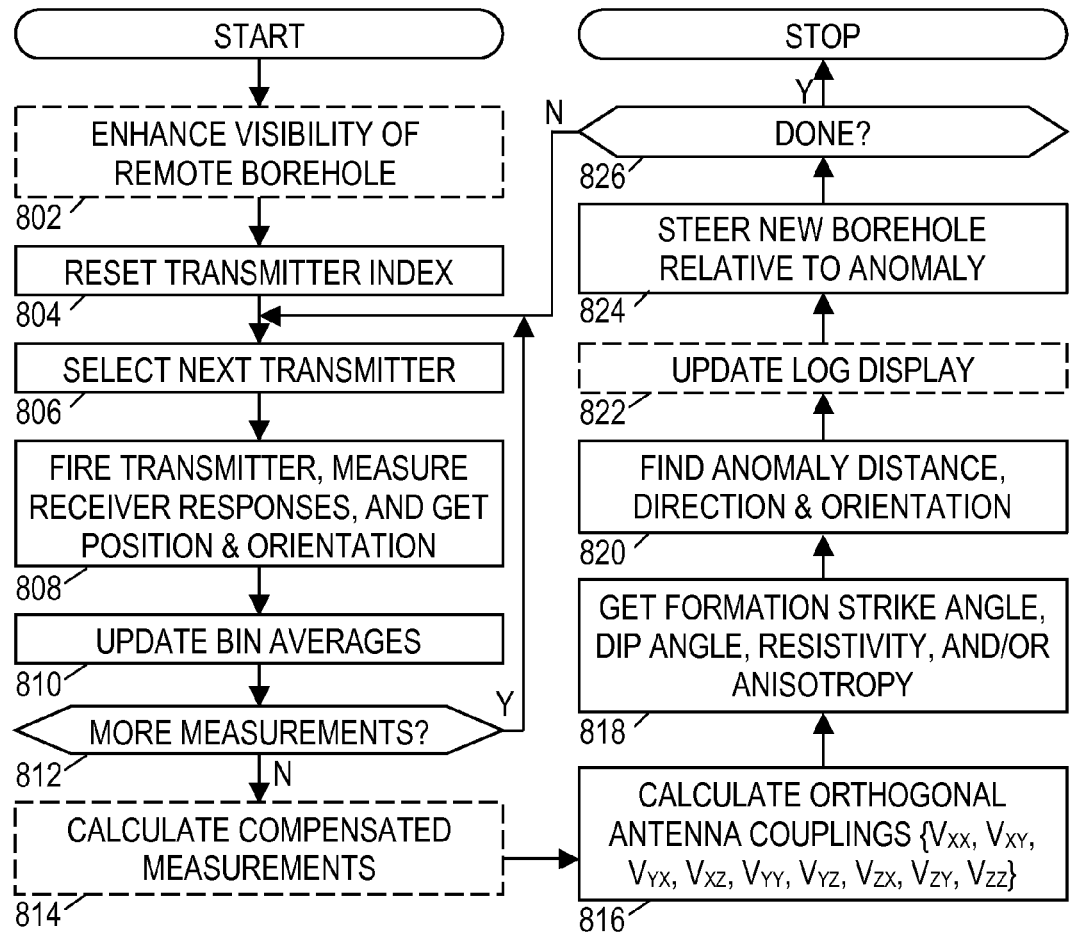
FIG. 14 is a flow diagram of an illustrative steering method.

In accordance with the foregoing disclosure, FIG. 14 is a flowchart of an illustrative steering method. Beginning in block 802, the oilfield operator optionally enhances the visibility of the existing well by casing the well and/or adding ferromagnetic material to the borehole. The ferromagnetic material can be included in the cement or carried into the formation by a carrier fluid during the completion operation.

In block 804, the logging tool initializes the transmitter index before entering a loop. In block 806, the index is updated and a corresponding transmitter is selected. In block 808, the tool uses the selected transmitter to transmit an electromagnetic signal into the formation. The tool further measures the induced response of each receiver and associates the measurements with the current position and orientation of the tool. In block 810, the tool (or the control unit for the bottomhole assembly) incorporates the new measurement values into the overall measurement for the bin associated with the current tool position and orientation. In block 812, the logging tool determines whether each of the transmitters has been fired and if not, the tool loops back to block 806.

After the measurement cycle has been completed, the tool (or control unit for the bottomhole assembly) optionally combines opposed transmitter-receiver pair measurements to obtain compensated measurements in block 814. In any event, the tilted-antenna measurements are used to compute the orthogonal antenna coupling strengths in block 816. In block 818, the formation parameters are found through inversion, and in block 820 the direction, distance, and orientation of the elongated anomaly are estimated. The user can be kept informed by updating a display with the latest information in block 822. In block 824, the formation and anomaly information can be used as the basis of a steering decision when directing the drilling process. Thus, depending on the circumstances, the new borehole can be steered to intersect, avoid, or parallel the existing well. A check occurs in block 826 to determine whether the drilling process is complete, and if not, the process returns to block 806. While some or all of the operations represented by blocks 816-820 and 824 can be performed downhole, it is expected that most system embodiments would use a surface data processing system to perform these operations.

In various simulations that were performed to demonstrate the workability of this tool, certain tool configurations were employed. In at least some instances, the transmitter-to-receiver separation was 25 feet, and a four inch mandrel radius was assumed. Each of the (orthogonal) transmitter and receiver antennas were assumed to have 200 turns. The tool was spaced along the X-axis at varying distances from a well having different orientations. With conservative noise levels, the detection depth was found to be 42 feet for a parallel well in a formation having a resistivity of 1 $\Omega$m, but decreasing to 28 feet for a perpendicular well. If the transmitter-receiver separation were increased from 25 feet to 100 feet, the detection range for a parallel well increased to 95 feet. When fluid treatments were employed in the target well to provide post-treatment resistivity values of 0.01 $\Omega$m or 0.001 $\Omega$m in a 3-foot radius around the well, signal enhancements of 1.5× (for 0.01 $\Omega$m) and 2× (for 0.001 $\Omega$m) were observed. For a formation resistivity of 20 $\Omega$m, both fluid treatments provided about a 1.5× enhancement. The detection depth was increased to about 66 foot, but there is some indication that further range increases may be available with the use of higher signal frequencies (e.g., above 3500 Hz). In a simulated comparison of treating a 6-foot well section with ferromagnetic fluid versus water (to a 3-foot invasion radius), the ferromagnetic fluid provided 100× greater signal strength than water. Some comparisons of the use of a magnetic fluid treatment to the omission of the treatment showed a near doubling of the detection distance.

Simulations also confirmed the tool's responsiveness to boundaries between formation layers of different resistivities. With signal frequencies in the range of 2-4 kHz, the tool was able to detect boundaries between 1 Ωm and 20 Ωm beds at distances of 33 feet.

FIGS. 15A-15D show the inverted parameter values for a simulated tool drilling past an existing well, such as might be encountered in a blowout situation. The simulated tool had one tri-axial transmitter and two tri-axial receivers following at 646 inches and 720 inches behind the transmitter. The signal frequency was chosen to be 250 Hz. The conductivity, diameter and thickness of the target casing is assumed to be known and given as $\sigma_a = 10^6$, $D_a = 8"$ and $t_a = 0.5"$. The path that the tool follows begins approximately at −50° distance to the anomaly with 5 degree tilt towards the target well-casing ($\theta_r = 5°$), and progresses along a constant curve toward the anomaly at 15°/100'. The tool trajectory is kept in a plane spaced 3' away from the target well casing. Both calibrated amplitude and calibrated phase measurements are fed into the tri-axial inversion algorithm shown in FIG. 13C, with 0.1% measurement noise added. The transmitter's closest approach to the existing well occurs at around time equal to 170. Only single-time data is used at each inversion step. By combining multiple time results, a much better accuracy in distance and tilt ($\theta_r$) can be achieved.

Figure 15B:
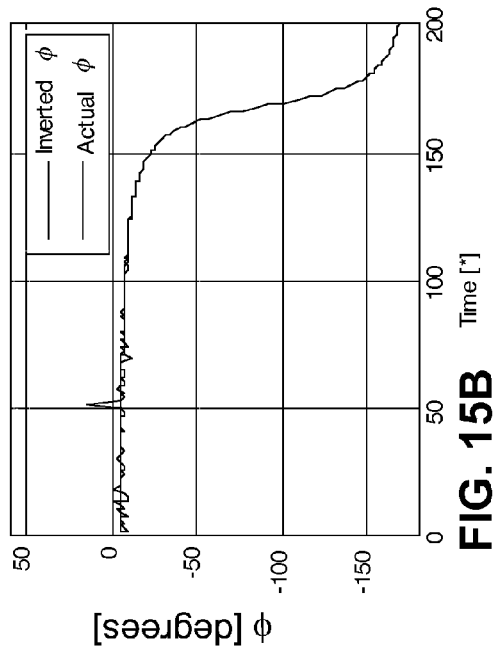
FIGS. 15A-15D are graphs of inverted parameter values for an illustrative simulation. The following description has broad application. Each disclosed embodiment and accompanying discussion is meant only to be illustrative of that embodiment, and is not intended to suggest that the scope of the disclosure is limited to that embodiment. To the contrary, the intention is to cover all modifications, equivalents and alternatives falling within the scope of the invention as defined by the appended claims
Figure 15D:
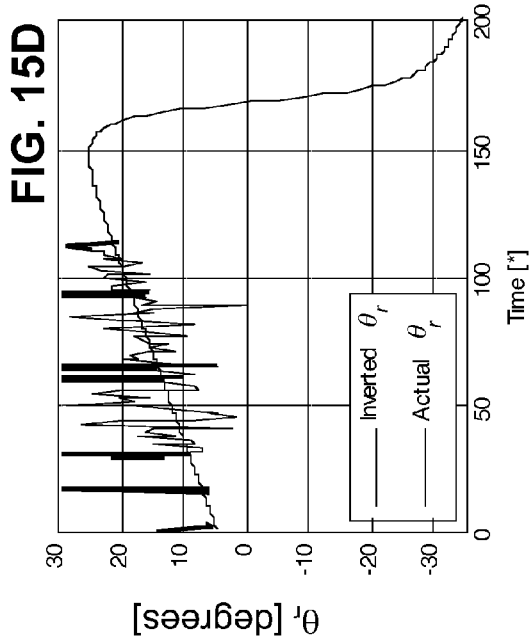
Figure 15A:
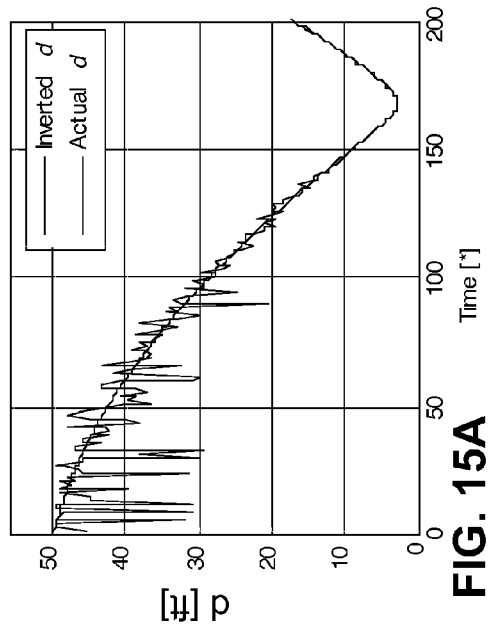
Figure 15C:
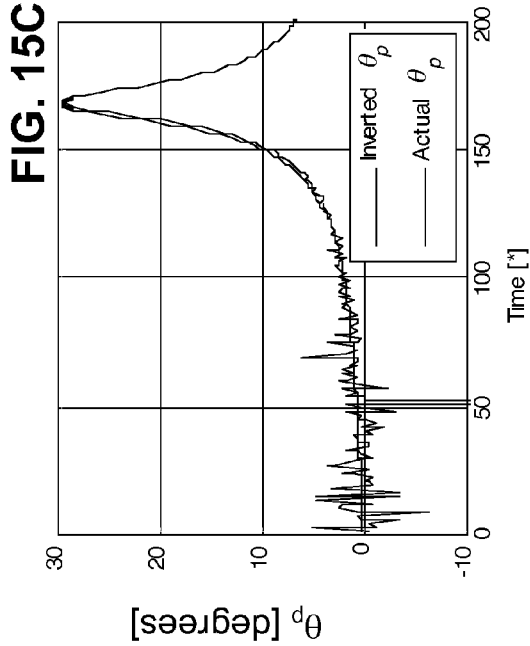

It can be seen from FIG. 15A (the distance parameter) that even at 50' the well casing is detected. However, the distance measurement exhibits a lot of error until the transmitter comes within about 25' (at around t=120). Similarly, the target well orientation represented by the $\theta_r$ and $\theta_\phi$ parameters shown in FIGS. 15C and 15D, exhibits a lot of error until the transmitter comes within about 25'. The scale of FIG. 15B makes it difficult to tell, but the behavior the azimuthal estimate also demonstrates this behavior. Within 25' from the well casing, all measurements stabilize and target well casing is successfully located. This example demonstrates that tool can successfully locate the well casing at a variety of distance and approach angles.

Numerous variations and modifications will become apparent, to those skilled in the art once the above disclosure is fully appreciated. For example, the foregoing disclosure assumes the use of coil antennas, but suitable measurements can also be obtained using other types of sensors including toroids, magnetometers, and electrodes. It is intended that the following claims be interpreted to embrace all such variations and modifications.

What is claimed is:

1. A geosteering system that comprises:
    a electromagnetic logging tool to obtain a multi-component response;
    a position and orientation tracking module to associate tool position and orientation information with measurements of the logging tool; and
    a processing system to invert the logging tool measurements to estimate formation parameters and the position and orientation of one or more elongated anomalies, said orientation being expressible in terms of a tilt angle of the elongated anomaly relative to a first line in an X-Y plane of the tool and a cross angle of the elongated anomaly relative to a second line in the X-Y plane perpendicular to the first line.

2. The system of claim 1, wherein the elongated anomalies include an existing well or borehole.

3. The system of claim 1, wherein the formation parameters include formation dip, strike, and resistivity.

4. The system of claim 1, wherein the processing system is operable to remove a formation contribution from the measurements before inverting to estimate the position and orientation of the elongated anomalies.

5. The system of claim 1, wherein the orientation of each elongated anomaly is specified in terms said tilt angle of the elongated anomaly relative to said first line in the X-Y plane and said cross angle of the elongated anomaly relative to said second line in the X-Y plane perpendicular to the first line.

6. The system of claim 5, wherein the elongated anomaly position relative to the tool is specified in terms of distance and azimuth in the X-Y plane to a nearest point on the elongated anomaly.

7. The system of claim 1, wherein the electromagnetic logging tool is operable to exhibit improved range and/or accuracy of detection when a contrast fluid is used to demarcate the elongated anomaly.

8. A geosteering system that comprises:
    a electromagnetic logging tool to obtain a multi-component response, wherein the multi-component electromagnetic logging tool includes at least a transmitter and a receiver, has a transmitter-receiver spacing greater than 25 feet and is operable to employ a signal frequency in the range between $10^2$ and $10^7$ Hz;
    a position and orientation tracking module to associate tool position and orientation information with measurements of the logging tool; and
    a processing system to invert the logging tool measurements to estimate formation parameters and the position and orientation of one or more elongated anomalies.

9. The system of claim 8, wherein the logging tool measurements include a phase and amplitude for each receiver in response to each transmitter.

10. A geosteering method that comprises:
    drilling a subterranean borehole with a steerable drilling assembly;
    collecting multi-component electromagnetic logging tool measurements, wherein the logging tool is part of the drilling assembly;
    processing the measurements to determine a position and orientation of a line representing an elongated anomaly, said orientation being expressible in terms of a tilt angle of the elongated anomaly relative to a first line in an X-Y plane of the tool and a cross angle of the elongated anomaly relative to a second line in the X-Y plane perpendicular to the first line; and
    steering the drilling assembly based at least in part on said position and orientation.

11. The method of claim 10, wherein said steering includes directing the drilling assembly along a path that parallels the elongated anomaly.

12. The method of claim 10, wherein said steering includes directing the drilling assembly along a path that avoids the elongated anomaly.

13. The method of claim 10, wherein the elongated anomaly is an existing well, and wherein said steering includes directing the drilling assembly along a path that intersects the existing well.

14. The method of claim 13, further comprising injecting fluid from the borehole into the existing well to kill the well, the fluid preferably being a drilling fluid.

15. The method of claim 10, wherein said processing includes:
   determining estimated formation parameters from the measurements;
   removing effects of the formation parameters to obtain anomaly measurements; and
   inverting the anomaly measurements to obtain said position and orientation.

16. The method of claim 10, wherein the measurements include amplitude and phase of each signal received in response to operation of a transmitter.

17. The method of claim 10, further comprising transforming the position and orientation from tool coordinates to earth coordinates.

18. The method of claim 10, further comprising enhancing visibility of the elongated anomaly through use of a contrast fluid.

19. The method of claim 10, wherein the orientation of the elongated anomaly is specified in terms of said tilt angle and said cross angle.

20. The method of claim 19, wherein the elongated anomaly position relative to the tool is specified in terms of distance and azimuth in the X-Y plane to a nearest point on the elongated anomaly.

\* \* \* \* \*